United States Patent
Mavroudis et al.

(10) Patent No.: US 9,867,390 B2
(45) Date of Patent: Jan. 16, 2018

(54) UMAMI-ACTIVE TOMATO FRACTION

(71) Applicant: Conopco, Inc., Englewood Cliffs, NJ (US)

(72) Inventors: Nikolaos Mavroudis, Newcastle-upon-Tyne (GB); Marco Giuseppe Mazzotti, Zurich (CH); Michael Jacobus Suijker, Vlaardingen (NL)

(73) Assignee: Conopco Inc., Englewood Cliffs, NJ (US)

( * ) Notice: Subject to any disclaimer, the term of this patent is extended or adjusted under 35 U.S.C. 154(b) by 385 days.

(21) Appl. No.: 14/365,808

(22) PCT Filed: Dec. 4, 2012

(86) PCT No.: PCT/EP2012/074312
§ 371 (c)(1),
(2) Date: Jun. 16, 2014

(87) PCT Pub. No.: WO2013/092196
PCT Pub. Date: Jun. 27, 2013

(65) Prior Publication Data
US 2015/0125581 A1 May 7, 2015

(30) Foreign Application Priority Data
Dec. 22, 2011 (EP) .................... 11195292

(51) Int. Cl.
| | | |
|---|---|---|
| *A23L 2/56* | (2006.01) |
| *A23L 1/222* | (2006.01) |
| *A23L 5/20* | (2016.01) |
| *A23L 27/00* | (2016.01) |
| *A23L 27/12* | (2016.01) |
| *A23L 27/21* | (2016.01) |
| *A23L 27/22* | (2016.01) |
| *A23L 23/00* | (2016.01) |

(52) U.S. Cl.
CPC ............ *A23L 1/222* (2013.01); *A23L 2/56* (2013.01); *A23L 5/20* (2016.08); *A23L 23/00* (2016.08); *A23L 27/12* (2016.08); *A23L 27/21* (2016.08); *A23L 27/22* (2016.08); *A23L 27/88* (2016.08); *A23V 2002/00* (2013.01)

(58) Field of Classification Search
CPC .......... A23L 19/09; A23L 27/88; A23L 27/12; A23L 1/222; A23L 2/56; A23L 5/20; A23L 5/27; A23L 5/273; A23L 27/21; A23L 27/22
USPC .................................. 426/490, 534, 589
See application file for complete search history.

(56) References Cited

FOREIGN PATENT DOCUMENTS

| | | | | |
|---|---|---|---|---|
| WO | WO9960868 A1 | 12/1999 | | |
| WO | WO2008040611 A1 | 4/2008 | | |
| WO | 2009/080763 A2 | 7/2009 | | |
| WO | WO2010069743 A1 | 6/2010 | | |
| WO | WO 2010079013 A2 * | 7/2010 | ......... | A23L 1/22091 |
| WO | WO2010079013 A2 | 7/2010 | | |
| WO | WO 2012072399 A1 * | 6/2012 | .......... | A23L 1/3002 |

OTHER PUBLICATIONS

Oruna-Concha et al, Differences in Glutamic Acid and 5'-Ribonucleotide Contents between flesh and pulp of tomatoes and the relationship with Umami taste, J Agric Food Chem, Jun. 14, 2007, 5776-5780, 55, GB.
International Search Report, PCT EP2012/074312, dated Mar. 27, 2013, 4 pp.
IPRP2 in PCTEP2012074312, dated May 9, 2014.
Written Opinion in EP11195292, dated May 16, 2012.
Written Opinion in PCTEP2012074312, dated Mar. 27, 2013, WO.
European Search Report from European Patent Application No. 11195292.5 dated May 16, 2012, 2 pp.

* cited by examiner

*Primary Examiner* — Walter A Moore
(74) *Attorney, Agent, or Firm* — NLO N.V.; Catherine A. Shultz

(57) ABSTRACT

The invention provides an efficient method for producing a high quality umami-active tomato fraction, said process comprising the steps of: a. providing a tomato serum; b. separating the tomato serum into two or more portions, including a lycopene-depleted portion and a lycopene-enriched portion; c. concentrating the lycopene-depleted portion to at least 10° Brix; d. chromatographically fractionating the concentrated lycopene-depleted portion into two or more fractions, including a crude umami fraction with a weight ratio glutamate:monosaccharide of X and a monosaccharide fraction with a weight ratio glutamate:monosaccharide of Y, wherein the ratio X:Y exceeds 20; e. optionally, concentrating the crude umami fraction; f. chromatographically fractionating the crude umami fraction into two or more fractions, including a clean umami fraction with a weight ratio glutamate:citrate of K and a citrate fraction with a weight ratio glutamate:citrate of L, wherein the ratio K:L exceeds 10. The invention further relates to a tomato isolate comprising glutamate, aspartate and sucrose; wherein the weight ratio glutamate:citrate exceeds 2 and wherein glutamate, 5'-AMP, aspartate and pyroglutamate together represent at least 15 wt. % of the dry matter contained in the tomato isolate.

7 Claims, No Drawings

UMAMI-ACTIVE TOMATO FRACTION

FIELD OF THE INVENTION

The present invention relates to tomato-derived fractions for adding and/or enhancing umami taste and to methods of preparing such fractions. The invention also relates to the use of these tomato-derived fractions in foodstuffs and beverages.

BACKGROUND OF THE INVENTION

The tongue is sensitive to five tastes: salt, sweet, bitter, sour, and "umami" in Japanese language, the taste of glutamate. There is no analogous word to describe this taste quality in the English language. "Umami" is used by the Japanese to describe the taste of monosodium glutamate (MSG, the sodium salt of the amino acid glutamic acid) as well as the taste of ripe tomatoes or the meaty taste of certain fish and broth. It should be noted that although glutamate is often referred to as flavour enhancer, this is probably incorrect as the umami taste is a taste on its own.

Monosodium glutamate (also know as Ve-Tsin or E621) is a controversial additive. However, clinical studies have so far given no reasons for concern. Hence, whereas MSG or glutamate can actually aid to providing healthier eating habits, consumer acceptance is generally low, even despite the proven safety of MSG. There is thus a need for umami-active compositions that are label friendly or that do not have to be mentioned on the labels at all.

One such composition has been described in WO 99/60868, which relates to a clear tomato concentrate comprising hydrolyzed tomato proteins. The clear tomato concentrate of WO 99/60868 is produced by processing tomatoes into two fractions, the serum and the pulp, and concentration of the serum to a value of e.g. 80 Brix, followed by hydrolysis (enzymatic or acid) of the concentrated serum. In an alternative embodiment, the serum is first hydrolyzed and then concentrated. The so obtained clear tomato concentrate may subsequently be dried.

WO 2008/040611 describes a method of producing a fractionated tomato extract having a pH of at least 4.6, when having a Brix value of 1.0; comprising 2.5-95 wt % of glutamic acid, based on the dry weight thereof; having a weight ratio of total glutamic acid to citric acid of at least 0.8 and a lycopene level of below 50 ppm, based on the dry weight of the extract, said process comprising the subsequent steps of preparing tomato serum and hydrolysing the proteins contained in the tomatoes from which the serum is prepared; subsequently fractionating the serum into two or more fractions, one fraction being rich in glutamic acid and low in citric acid and lycopene. The tomato fraction contains increased amounts of gamma-aminobutyric acid (GABA). Sugars, in particular the monosaccharides glucose and fructose, are considered to enhance the umami taste, and are kept within specific limits of monosaccharide to glutamic acid ratio.

WO 2009/080763 and WO 2010/079013 describe processes for producing an umami-active tomato fraction, involving the subsequent steps of providing a tomato serum, preferably substantially free from sucrose; separating the serum into two or more portions: at least one first portion and at least one second portion whereby the at least one first portion is lower in lycopene than the at least one second portion; concentrating the at least one first portion low in lycopene; fractionating the lycopene-depleted concentrated serum into fractions with well-defined w/w ratio of citric acid to glutamic acid (C/Glu). The umami-active tomato fractions obtained in '763 and '013 are characterized by comprising relative high levels of glucose and/or fructose and low levels of glutamic acid, and have glucose to glutamic acid ratios in excess of 4.

WO 2010/069743 relates to a liquid umami-enhancing composition for use in food products having very low levels of glutamic acid while maintaining an umami taste perception similar to products with normal levels of glutamic acid. The composition is characterized by a w/w ratio of glutamic acid to citric acid of at most 0.6 and comprises at most 2 wt % of glutamic acid.

The above-described methods suffer from the drawbacks that they produce a rather crude umami fraction and/or that the fractionation process is inefficient.

SUMMARY OF THE INVENTION

The inventors have developed a very efficient method for producing a high quality umami-active tomato fraction, said process comprising the steps of:
a. providing a tomato serum;
b. separating the tomato serum into at least a lycopene-depleted portion and a lycopene-enriched portion;
c. concentrating the lycopene-depleted portion;
d. chromatographically fractionating the concentrated lycopene-depleted portion into at least two fractions, including a crude umami-rich fraction and a monosaccharide-rich fraction;
e. optionally, concentrating the crude umami fraction;
f. chromatographically fractionating the crude umami fraction into at least two fractions, including a clean umami fraction and a citrate fraction.

The present invention comprises at least two chromatographic fractionation steps for producing umami fractions, wherein the earlier fractionation step involves removing a major amount of the monosoaccharides from a lycopene-depleted portion of tomato serum to produce a crude umami fraction. The monosaccharide-depleted crude umami fraction is then subjected to another chromatographic fractionation step for removal of citrate. The process of the invention provides an efficient and economical means of preparing a high quality umami extract from tomato.

The invention also provides a tomato isolate comprising 0-90 wt. % water and 10-100 wt. % dry matter, said dry matter comprising:
  3-40 wt. % glutamate;
  0-8 wt. % 5'-adenosine monophosphates (5'-AMP);
  1-25 wt. % aspartate;
  0-20 wt. % citrate;
  0-10 wt. % monosaccharides;
  0.1-15 wt. % sucrose; and
wherein the weight ratio glutamate:citrate exceeds 2 and wherein glutamate, 5'-AMP, aspartate and pyroglutamate together represent at least 15 wt. % of the dry matter contained in the tomato isolate.

The aforementioned glutamate-rich tomato isolate can suitably be used to impart umami taste to foodstuffs and beverages.

DETAILED DESCRIPTION OF THE INVENTION

In a first aspect, the invention pertains to a method for producing an umami-active tomato fraction comprising the steps of:

a. providing a tomato serum having a total solids content of 0.05-30 wt. %;
b. separating the tomato serum into two or more portions, including a lycopene-depleted portion and a lycopene-enriched portion, the lycopene content of the lycopene-depleted portion being less than 30% of that of the lycopene-enriched portion, both said lycopene contents being calculated on dry matter;
c. concentrating the lycopene-depleted portion to at least 10° Brix;
d. chromatographically fractionating the concentrated lycopene-depleted portion into two or more fractions, including a crude umami fraction with a weight ratio glutamate:monosaccharide of X and a monosaccharide fraction with a weight ratio glutamate:monosaccharide of Y, wherein the ratio X:Y exceeds 20;
e. optionally, concentrating the crude umami fraction;
f. chromatographically fractionating the crude umami fraction into two or more fractions, including a clean umami fraction with a weight ratio glutamate:citrate of K and a citrate fraction with a weight ratio glutamate:citrate of L, wherein the ratio K:L exceeds 10.

The term "tomato serum" as used herein refers to a liquid that can be obtained from tomato paste or tomato juice by removing particles therefrom, e.g. by centrifugation or filtration.

The terminology "chromatographically fractionating" as used herein refers to a procedure in which a composition is fractionated by passing it as (part of) a mobile phase through a structure, e.g. a column, holding a stationary phase and by collecting the effluent in different portions.

The term "ion exclusion chromatography" as used herein refers to a form of ion exchange chromatography in which the mobile ions in the resin-gel phase electrically neutralize the immobilized charged functional groups attached to the resin, thus preventing penetration of solvent electrolyte into the resin-gel phase.

The term "Brix value" which is considered to be synonymous to the term Degrees Brix (symbol ° Bx or ° Brix) is an indirect measurement of the amount of dry matter. It is a measure of the percent total soluble solids in a given weight of plant juice, which includes the summation of sucrose glucose, fructose, vitamins, amino acids, protein, and any other soluble solids. It is often expressed as the percentage of sucrose. It is measured with a refractometer with a Brix scale.

The terms "glutamic acid" and "glutamate" are commonly used to refer to the protonated and the deprotonated solubilised form of the same acid, respectively. In addition glutamate is commonly used to refer to salts of the free acid. For the sake of convenience, the term "glutamate" as used herein, unless indicated otherwise, encompasses glutamic acid, salts of glutamic acid and combinations thereof.

Likewise, the terms "citrate", "aspartate", "malate" and "pyroglutamate" as used herein, unless indicated otherwise, encompass both the protonated and deprotonated forms of these acids.

The terms "comprising" and "containing" whenever used in this document is intended to indicate the presence of stated features, integers, steps, components, but not to preclude the presence or addition of one or more other features, integers, steps, components or groups thereof.

Typically, the tomato serum employed in the present method contains less than 1 wt. %, more preferably less than 0.5 wt. % and most preferably less than 0.1 wt. % particles having a diameter of 100 μm or more. The tomato serum optionally has been concentrated to a Brix value of not more than 60° Brix.

The tomato serum that is employed as a starting material in the present process may suitably be obtained by a process comprising the steps of:
  comminuting and/or macerating tomatoes to produce a pumpable mass; and
  separating the pumpable mass, optionally after dilution or concentration, into serum and pulp by means of a centrifugal separator (e.g. a decanter).

According to a preferred embodiment the comminuting and/or macerating of the tomatoes is carried out in a chopper pump, wherein the tomatoes are pressed through square holes, typically 1-2 cm in diameter.

In a particularly advantageous embodiment, heat is applied prior to, during or after the comminuting and or macerating of the tomatoes. Preferably, the amount of heat applied is such that the tomatoes reach a temperature of above 80° C. This process is generally referred to as hot break.

In accordance with a preferred embodiment of the invention seeds and skin are removed from the pumpable mass, typically by sieving using perforated screens or the like, prior to the separation.

Optionally, the serum so obtained may be clarified by micro filtration, so as to remove undissolved solids.

In the present method the serum is separated into two or more portions, including a lycopene-depleted portion and a lycopene-enriched portion, the lycopene content of the lycopene-depleted portion being less than 20 wt %, preferably less than 15% and most preferably less than 5% of that of the lycopene-enriched portion, both said lycopene contents being calculated on dry matter.

The lycopene content of the lycopene-depleted portion typically is less than 20 mg per kg of dry matter, more preferably less than 10 mg per kg of dry matter, even more preferably less than 5 mg per kg of dry matter, and most preferably less than 3 mg per kg of dry matter.

The serum used as starting material for this separation step may be processed in undiluted form or alternatively it may have been concentrated before further processing in the separation step. Preferably, the serum has been concentrated prior to the separation step. The tomato serum may be concentrated by removing at least part of the water content e.g. under reduced pressure and/or increased temperature. Preferably the concentration is performed using a falling film evaporator, spinning column evaporator or plate evaporator, although entirely different systems are available and can be used without departing from the scope of the invention.

The tomato serum that is employed in the separation step typically has Brix value of at least 3° Brix, more preferably at least 5° Brix. According to a particularly preferred embodiment prior to the separation step the tomato serum has been concentrated to a Brix value of at least 10° Brix, more preferably at least 20° Brix. Typically the Brix value of the serum does not exceed 50° Brix, more preferably it does not exceed 40° Brix.

The tomato serum employed in the present method typically contains by weight of dry matter:
  30-80% monosaccharides;
  0.5-8% sucrose;
  2-30% citrate;
  1.5-20% glutamate;
  0.4-6% aspartate;
  0.5-15% pyroglutamate;

0.1-3% 5'-adenosine monophosphate (5'-AMP);
0.001-0.05% lycopene;
0-30% of other tomato components.

The separation of the tomato serum preferably comprises micro-filtering and/or ultra-filtrating the serum to produce a lycopene-depleted portion as the permeate and a lycopene-enriched portion as the retentate. The micro-filtering of the serum preferably comprises passing the serum through a micro-filter having a pore-size of less than 10 μm. The ultra-filtering of the serum preferably comprises passing the serum through a membrane with a molecular weight cut off of not more than 250 kDa, more preferably of not more than 200 kDa, even more preferably of not more than 150 kDa.

For the ultra filtration, any suitable membrane may be used. An example of a suitable membrane is an Alfa-Laval polysulphone membrane with 100 kDa molecular weight cut-off (GR40PP).

The lycopene-depleted portion typically comprises less than 5 ppm of particles of at least 10 μm, more preferably less than 3 ppm of particles of at least 10 μm, even more preferably less than 1 ppm of particles of at least 10 μm.

Typically, the lycopene-depleted portion contains, by weight of dry matter:
30-80% monosaccharides;
0.5-8% sucrose;
2-30% citrate;
1.5-20% glutamate;
0.4-6% aspartate;
0.5-15% pyroglutamate;
0.1-3% 5'-adenosine monophosphate (5'-AMP);
0-30% of other tomato components.

The lycopene-depleted portion is suitably concentrated to at least 10° Brix before it is subjected to chromatographic separation. Even more preferably, the lycopene-depleted portion is concentrated to a Brix value of 20-60° Brix.

The concentrated lycopene-depleted portion obtained from the separation step is chromatographically fractionated into two or more portions, including a crude umami fraction with a weight ratio glutamate:monosaccharide of X and a monosaccharide fraction with a weight ratio glutamate:monosaccharide of Y, the ratio X:Y preferably exceeding 40, more preferably exceeding 100 and most preferably exceeding 500.

Chromatographic fractionation of the lycopene-depleted portion is preferably achieved by using ion exclusion chromatography, whereby the chromatographic separation medium is an ion exchange resin.

Suitable ion exchange resins include DIAION™ UBK-530 and UBK-550 (each of which is produced by Mitsubishi Chemical Corporation). Preferred resins are negatively charged (and thereby capable of strong repulsion of negatively charged compounds). Especially preferred is UBK-530, a strong acid cation resin containing, as a base material, polystyrene-divinyl benzene gel (produced by MITSUBISHI CHEMICAL CORP.; Na+-type; average particle size: 200 to 240 μm; exchange capacity: 1.6 meq/ml).

Any appropriate solvent may be used as eluent during the chromatographic fractionation, but water is preferred. Even more preferred, the eluent employed in the present process is demineralised water. More preferred is water purified by, for example, reverse osmosis (e.g. MilliQ). In other words, it is preferred to employ an eluens that does not contain a buffer.

The present invention offers the advantage that it enables the isolation of an umami-active tomato fraction without using organic solvents. Thus, in accordance with a particularly preferred embodiment of the invention no organic solvents are used in the present method.

Applicants have found that the fractionation is more robust and cost-effective when it is carried out at elevated temperatures. The chromatographic fractionation is preferably carried out at a temperature of at least 40° C., preferably at least 50° C., more preferably at least 60° C. Typically, the chromatographic fractionation is carried out at a temperature that does not exceed 105° C.

The inventors have unexpectedly discovered that the separation efficiency of the ion exchange resins used in the present method can be maintained for a much longer period of time if prior to subjecting the lycopene-depleted portion to ion exclusion or ion exchange chromatography, the multivalent metal cation content of said portion is reduced substantially.

Hence, according to a particularly preferred embodiment of the invention, prior to the chromatographic fractionation, the concentrated lycopene-depleted portion is treated to reduce the total amount of calcium ($Ca^{2+}$) and magnesium ($Mg^{2+}$) ions, calculated on dry matter, with at least a factor 4, preferably at least a factor 8 and most preferably at least a factor 16.

Although the inventors do not wish to be bound by theory, it is believed that the divalent cations $Ca^{2+}$ and $Mg^{2+}$ can reduce the number of available charges of the ion exclusion resin by forming stable bridges between adjacent negatively charged resin groups, thereby impairing the ion exclusion ability of the resin bed. As the adsorption of these divalent cations by the resin progresses, chromatographic resolution of charged and neutral compounds will increasingly deteriorate. Thus, reduction of the multivalent ion content of the lycopene-depleted portion greatly improves the efficiency of chromatographic separation of glutamate and monosaccharides during the first chromotagraphic separation step.

Examples of techniques that may suitably be used for selectively removing $Ca^{2+}$ and $Mg^{2+}$ from the concentrated lycopene-depleted serum portion include electrodialysis, nanofiltration, ion exchange chromatography or combinations thereof. Preferably, ion exchange chromatography is used.

The lycopene-depleted portion is preferably treated to reduce the total amount of calcium and magnesium ions to less than 50 mmol, more preferably less than 20 mmol and most preferably less than 10 mmol per kg of dry matter. Advantageously, the removal of $Ca^{2+}$ and $Mg^{2+}$ is carried out in such a way that the composition of the bulk remains largely unaffected. Preferably, at least 90 wt. %, more preferably at least 95 wt. % and most preferably at least 99 wt. % of the dry matter contained in the lycopene depleted composition is unaffected by the removal of the calcium and magnesium ions.

Typically, in the present method at least 60% of the glutamate, more preferably at least 80% of the glutamate contained in the lycopene-depleted portion is recovered in the crude umami fraction that is obtained from the first chromatographic separation step.

The weight ratio X (glutamate:monosaccharide) in the crude umami fraction obtained by chromatographic fractionation of the concentrated lycopene-depleted portion typically is at least 3, preferably at least 5 and most preferably at least 10.

The crude umami fraction typically has a weight ratio citrate:monosaccharide of at least 1, more preferably of at least 3 and most preferably of at least 10.

Preferably, the crude umami fraction contains at least 1.5%, more preferably at least 3% and most preferably at least 6% glutamate by weight of dry matter.

The monosaccharide content of the crude umami fraction preferably is less than 20%, more preferably less than 10%, even more preferably less than 5% and most preferably less than 3% by weight of dry matter.

The weight fraction Y (glutamate:monosaccharide) of the monosaccharide fraction typically is less than 0.1, more preferably less than 0.01 and most preferably less than 0.003.

The monosaccharide fraction typically has a weight ratio citrate:monosaccharide of less than 0.01, more preferably of less than 0.005.

The monosaccharide content of the monosaccharide fraction preferably is at least 80% by weight of dry matter, more preferably at least 90% by weight of dry matter and most preferably at least 95% by weight of dry matter.

In a particularly advantageous embodiment of the invention, at least 90% of the glutamate, at least 80% of the citrate and less than 10% of the monosaccharide contained in the lycopene-depleted portion is recovered in the crude umami fraction.

In the present method the crude umami fraction that is obtained from the chromatographic fractionation of the lycopene depleted portion typically has a Brix value of 2-20° Brix, more preferably of 3-12° Brix. The monosaccharide fraction typically has a Brix value of 4-30°, especially 6-20° Brix.

Typically, the crude umami fraction obtained as described herein above contains, by weight of dry matter:
- 0-20% monosaccharides;
- 0.5-20% sucrose;
- 5-40% citrate;
- 3-40% glutamate;
- 1-10% aspartate;
- 1-20% pyroglutamate
- 0.1-5% 5'-AMP;
- 0-40% of other tomato components.

The crude umami fraction that is used as feed for the second chromatographic fractionation step may optionally be concentrated beforehand. Preferably, the crude umami fraction is concentrated to a Brix value of at least 8°, more preferably 15-40° Brix prior to the second chromatographic separation step.

The clean umami fraction obtained from the second chromatographic separation step typically comprises by weight of dry matter:
- 6-75%, preferably 10-45% glutamate;
- 0-10%, preferably 0.5-6% 5'-AMP;
- 1-25%, preferably 2-20% aspartate;
- 0-20%, preferably 0-10% citrate;
- 0-10%, preferably 0-5% monosaccharides;
- 0.1-15%, preferably 0.5-15% sucrose; and wherein the weight ratio glutamate:citrate exceeds 2 and wherein glutamate, 5'-AMP, aspartate and pyroglutamate together represent at least 15%, preferably at least 25% and most preferably at least 35% by weight of the dry matter contained in the tomato isolate.

For the second chromatograph fractionation step, ion exclusion chromatography or ion exclusion chromatography may advantageously be used.

The second fractionation step serves to further increase the amounts of desirable compounds relative to undesirable compounds. In the second fractionation step a clean umami fraction with a weight ratio K (glutamate:citrate) and a citrate fraction with a weight ratio L (glutamate:citrate) are obtained, wherein the ratio K:L exceeds 50, more preferably exceeds 100 and most preferably exceeds 500.

The benefits of the present invention are particularly pronounced in case the second fractionation is carried out such that K is at least 2, more preferably of at least 3 and most preferably of at least 6.

The ratio L achieved in the citrate fraction preferably is less than 0.1, more preferably less than 0.05 and most preferably less than 0.01.

Typically, at least 60% of the glutamate, more preferably at least 80% of the glutamate contained in the crude umami fraction is recovered in the clean umami fraction.

The glutamate content of the clean umami fraction typically exceeds 6% by weight of dry matter, more preferably 10% by weight of dry matter and most preferably 15% by weight of dry matter.

The present method enables the production of a clean umami fraction with a low citrate content. Typically, less than 10% of the citrate contained in the crude umami fraction is recovered in the clean umami fraction.

The clean umami fraction typically contains not more than 30% citrate by weight of dry matter, more preferably not more than 20% citrate by weight of dry matter, most preferably not more than 10% citrate by weight of dry matter.

The umami characteristics of the clean umami fraction obtained by the present method were found to benefit from the presence of 5'nucleoside monophosphates. Thus, the chromatographic fractionations are preferably carried out in such a way that a substantial fraction of the 5'nucleoside monophosphates present in the tomato serum end up in the clean umami fraction. Of the 5'nucleoside monophosphates found in tomato, 5'adenosine monophosphate (5'AMP) is most abundant. Preferably, the clean umami fraction contains at least 0.3%, more preferably at least 0.8% and most preferably at least 1.7% of 5'-AMP by weight of dry matter.

The present method enables glutamate to be isolated from tomato serum in high yield. Typically, at least 70% of the glutamate contained in the tomato serum is recovered in the clean umami fraction. More preferably at least 75% and most preferably at least 80% of the glutamate contained in the tomato serum is recovered in the clean umami fraction.

The citrate fraction that is produced by the second chromatographic fractionation step preferably contains at least 20%, more preferably at least 25% and most preferably at least 30% citrate by weight of dry matter.

The glutamate content of the citrate fraction typically is less than 2% by weight of dry matter, more preferably less than 1.5% by weight of dry matter and most preferably less than 1.0% by weight of dry matter.

In the present method the clean umami fraction that is obtained from the chromatographic fractionation of the crude umami fraction typically has a Brix value of 0.3-20° Brix, more preferably of 0.5-12.5° Brix. The citrate fraction typically has a Brix value of 0.3-20°, especially 0.5-12.5° Brix.

The chromatographic fractionation of the lycopene depleted portion and the crude umami fraction is suitably carried out using simulated moving bed chromatography.

Another aspect of the present invention relates to a tomato isolate comprising 0-90 wt. % water and 10-100 wt. % dry matter, said dry matter comprising:
- 6-75%, preferably 10-45% glutamate;
- 0-10, preferably 0.5-6% 5'-AMP;
- 1-25%, preferably 2-20% aspartate;
- 0-20%, preferably 0-10% citrate;
- 0-10%, preferably 0-5% monosaccharides;

0.1-15%, preferably 0.5-15% sucrose; and
wherein the weight ratio glutamate:citrate exceeds 2 and
wherein glutamate, 5'-AMP, aspartate and pyroglutamate
together represent at least 15 wt. %, preferably at least 25 wt. % and most preferably at least 35 wt. % of the dry matter contained in the tomato isolate.

Advantageously, the isolate is an optionally dehydrated clean umami fraction obtained using the isolation method of the present invention.

The tomato isolate of the present invention typically contains at least 10% potassium, more preferably at least 12% and most preferably 15-40% potassium by weight of dry matter According to a preferred embodiment, the weight ratio glutamate:citrate in the present tomato isolate exceeds 3, more preferably it exceeds 6 and most preferably it exceeds 10. The weight ratio glutamate:monosaccharides of the tomato isolate preferably exceeds 5, more preferably it exceeds 8 and most preferably it exceeds 15.

In accordance with a further embodiment, the weight ratio 5'-AMP:glutamate in the present tomato isolate lies within the range of 0.02 to 0.5, preferably of 0.05 to 0.3.

Advantageously, the 5'-nucleoside monophosphates contained in the tomato isolate are composed of at least 60 wt. % 5'-AMP; less than 10 wt. % 5'-UMP; and less than 10 wt. % GMP.

The tomato isolate according to the present invention typically has a Brix value of at least 20° Brix, more preferably of at least 40° Brix, most preferably of at least 60° Brix.

The present tomato isolate may suitably be converted into a powder by combining it with a carrier material and drying the resulting mixture, e.g. by means of spray drying or drum drying. Examples of carrier materials that may suitably employed include sodium chloride, maltodextrin, starches and combinations thereof. Most preferably, the carrier material employed is sodium chloride. Typically, the carrier material is combined with the tomato isolate in an amount that equates 30-50 wt. %, more preferably 10-25 wt. % of the dry matter contained in the tomato isolate.

Yet another aspect of the invention relates to a process for manufacturing a foodstuff or a beverage, said process comprising combining a tomato isolate according to the invention with one or more other ingredients so as to provide glutamate in an amount of at least 0.01% by weight of the foodstuff or beverage. In the present process the tomato isolate may be introduced as such; in the form of a pre-blend with one or more other ingredients; or in the form of a powder that is obtained by the drying method described herein before.

The benefits of the present process are particularly appreciated in case the tomato isolate is employed in a foodstuff or beverage that contains tomato ingredients other than the tomato isolate. Accordingly, in a preferred embodiment, such a foodstuff or beverage contains at least 1%, more preferably at least 20% and most preferably at least 35% tomato solids other than the tomato isolate by weight of dry matter. Examples of foodstuffs or beverages containing tomato ingredients include ketchup, tomato soup, tomato sauce and tomato juice.

Yet another aspect of the invention relates to a foodstuff or a beverage obtained by the process described above. Preferably, said foodstuff or beverage is selected from ketchup, tomato soup, tomato sauce and tomato juice.

The invention is further illustrated by the following non-limiting examples.

EXAMPLES

Example 1

A hot break tomato juice was subjected to solids removal using a decanter and centrifuge followed by lycopene removal using an ultra-filtration process.

Fresh hot break juice (4.5° Bx and 75° C.) was decanted in a NX416 decanter (Alfa Laval) at 3150 rpm (diff speed 63 Hz, 2080 G) to produce a fibre fraction and clarified juice in a weight ratio of approximately 1:10. The clarified juice was centrifuged in a high speed separator (Clara 80, Alfa Laval) to remove a small fraction (appr. 0.02 wt. %) of insoluble solids. The double clarified juice so obtained did not contain detectable spin solids).

The double clarified juice was separated over a Spiral Ultra Filtration Module 3X3X6338/80 with a GR60PP membrane (run at VCF 6) to yield 1 part of retentate and 5 parts of permeate. The retentate (lycopene-enriched portion) contained 101 mg/kg lycopene, whereas the permeate (lycopene-depleted portion contained less than 1 mg/kg lycopene.

Example 2

The lycopene-depleted portion obtained by the procedure described in Example 1 was subjected to IEX chromatography to remove Ca and Mg.

The lycopene-depleted portion was concentrated to 40° Bx before being loaded onto a set of 4 200×3000 mm steel Exchange columns in a 2 by 2 configuration using pilot scale ion exchange equipment (Unipektin Engineering AG, Eschenz Switzerland). The columns with a bed volume of 75 L each were filled with ion exchange resin (Lewatit S-2568, LanXess K⁺-form). The lycopene-depleted portion was followed by demi-water eluent. The combined streams were collected and yielded 290 L of calcium and magnesium depleted material with an average concentration of 8.7° Bx.

The composition of the lycopene-depleted portion before and after IEX treatment is shown in Table.

TABLE 1

| Sample | [Ca] mmol/kg DM | [Mg] mmol/kg DM |
|---|---|---|
| Before IEX treatment) | 21 | 77 |
| After IEX treatment | 0.4 | 5.3 |

Example 3

The lycopene-depleted portion that had been subjected to the IEX treatment described in Example 2 was concentrated to 39.5° Bx and subsequently separated into a crude umami fraction and a monosaccharide fraction by means of Simulated Moving Bed (SMB) chromatography.

45.4 L of the concentrate was fed to the feed port of an SMB apparatus. At the same time 390.7 L of demineralised water was fed to the eluent port. The SMB equipment contained a CSEP® C9116 32 port rotary valve (Knauer GmbH, Berlin, Germany) that was connected to 8 chromatography columns creating 4 separation zones.

Four pumps were controlling the flows in each zone. The SMB equipment was operated in open loop mode, creating a third stream. The columns having dimensions 210*50 mm were packed with Diaion™ UBK-530 resin in the K-form.

While constantly feeding and eluting the columns, two product streams were collected:

164.9 L of a raffinate stream (crude umami fraction) from zone 3 with an average concentration of 5.0° Bx; and 130.2 L of an extract stream (monosaccharide fraction) from zone 2 with an average concentration of 9.5° Bx The compositions of the feed, the monosaccharide fraction and the crude umami fraction are depicted in Table 2.

TABLE 2

|  |  | Feed | Monosacch. fraction | Crude umami fraction |
|---|---|---|---|---|
| Brix | ° Bx | 39.5 | 9.5 | 5.0 |
| Dry matter | % | 39.0 | 9.4 | 5.2 |
| Glucose | g/kg | 104.2 | 41.5 | <0.4 |
| Fructose | g/kg | 133.2 | 54.8 | <0.4 |
| Sucrose | g/kg | 2.0 | 0.0 | 0.9 |
| Citric acid | g/kg | 27.7 | <0.4 | 9.3 |
| Pyroglutamic acid | g/kg | 14.1 | <0.4 | 4.7 |
| Glutamic acid | g/kg | 11.6 | <0.4 | 3.9 |
| Aspartic acid | g/kg | 5.1 | <0.4 | 1.7 |
| Potassium | g/kg | 34.5 | <0.0001 | 10.8 |
| AMP | g/kg | 0.96 | <0.02 | 0.32 |
| UMP | g/kg | 0.37 | <0.02 | 0.16 |
| GMP | g/kg | <0.02 | <0.02 | <0.02 |
| CMP | g/kg | <0.02 | <0.02 | <0.02 |
| IMP | g/kg | <0.02 | <0.02 | <0.02 |

Example 4

The crude umami fraction obtained by the procedure described in Example 3 was subjected to another SMB chromatographic separation to yield a clean umami fraction and a citrate fraction.

2.8 L crude umami fraction that had been preconcentrated to 21.5° Bx was fed to the feed port of the same SMB apparatus as used in Example 3. At the same time 81.0 L of demineralised water was fed to the eluent port. The SMB equipment was again operated in open loop mode.

While constantly feeding and eluting the columns, two product streams were collected:

40.0 L of a raffinate stream (citrate rich fraction) from zone 3 with an average concentration of 1.1° Bx; and 28.1 L of an extract stream (clean umami fraction) from zone 2 with an average concentration of 1.1° Bx The composition of the feed and the two product streams are depicted in Table 3

TABLE 3

|  |  | Feed | Clean umami fraction | Citric fraction |
|---|---|---|---|---|
| Brix | ° Bx | 21.5 | 1.1 | 1.1 |
| Dry matter | % | 21.5 | 0.8 | 1.0 |
| Sucrose | g/kg | 3.2 | 0.3 | ND |
| Citric acid | g/kg | 38.9 | <0.05 | 3.7 |
| Pyroglutamic acid | g/kg | 19.8 | 1.1 | 0.8 |
| Glutamic acid | g/kg | 14.6 | 1.4 | 0.1 |
| Aspartic acid | g/kg | 6.3 | 0.6 | ND |
| Potassium | g/kg | 45.0 | 1.96 | 2.11 |
| AMP | g/kg | 1.13 | 0.14 | 0.02 |
| UMP | g/kg | 0.54 | 0.03 | 0.02 |

Example 5

A clean umami fraction obtained by a procedure as described in Examples 1-4 was used to replace a standard yeast extract in 2 different products:
Base for vegetable broth
French vegetable bouillon On a dry weight basis 2.75 parts of the standard yeast extract were replaced by 1 part of the clean umami fraction. Since yeast extract contains salt, an equivalent amount of salt was added together with the clean umami fraction.

For both the base for vegetable broth and the French vegetable bouillon, the intensity of the 'umami' taste attribute was not affected by the replacement of yeast extract by the clean umami extract.

Example 6

The clean umami fraction obtained by a procedure as described in Examples 1-4 was used to replace monosodium glutamate (MSG) and/or yeast extract in tomato soup.

The combined amount of MSG and yeast extract in the reference product in relation to tomato solids was 1 to 6.6. The clean umami fraction was applied in an amount, calculated on a dry weight basis of 1 part umami fraction to 16 parts tomato solids.

Tomato soup was prepared by combining a dry tomato soup base that contained no added MSG or yeast extract with monosodium glutamate, yeast extract, clean umami fraction (preheated) or a combination of two of these taste enhancing ingredients. Next, boiling water was added to prepare the soup.

The intensity of the 'umami' taste of each of the hot soups was evaluated by an expert panel and ranked (the higher the score, the higher the intensity). The results are shown in Table 4

TABLE 4

|  | Intensity score |
|---|---|
| Yeast extract + umami fraction | 6.6 |
| MSG + umami fraction | 6.3 |
| Umami fraction | 6.2 |
| Reference (yeast extract + MSG) | 6.0 |

It was found that the addition of the umami fraction also contributed positively to the taste of the tomato soup in that it imparted fresh tomato character.

Example 7

A clean umami fraction as described in Example 4 was concentrated by evaporation to 7.0° Bx using a Buchi rotavapor R220 (75 mbar, 60° C.). To the concentrate so obtained NaCl was added as drying aid (approx 20% on DM). 870 g of the concentrate with added salt was dried using a Mini Spray Dryer B290 system of Buchi ($T_{in}$ 140° C., $T_{out}$ 75° C., pump 5.6 g/min).

The composition of the powder so obtained is depicted in Table 5.

TABLE 5

|  | g/kg |
|---|---|
| Citrate | <0.05 |
| Pyro-glutamate | 91.6 |

TABLE 5-continued

|  | g/kg |
| --- | --- |
| Glutamate | 108.3 |
| Sucrose | 35.0 |
| AMP | 11.5 |
| Aspartate | 28.7 |
| NaCl | 220 |
| Moisture % | 13.2 |

The invention claimed is:

1. A method comprising the steps of:
 a. providing a tomato serum having a total solids content of 0.05-30 wt %;
 b. separating the tomato serum into two or more portions, including a lycopene-depleted portion and a lycopene-enriched portion, the lycopene content of the lycopene-depleted portion being less than 30 wt % of that of the lycopene-enriched portion, both the lycopene contents being calculated on dry matter; wherein the separating step further comprises at least one of:
  (i) micro-filtering the tomato serum through a micro-filter having a pore-size of less than 10 micrometers or
  (ii) ultra-filtrating the tomato serum through a membrane with a molecular weight cut off of 250 kDa or less;
  to produce the lycopene-depleted portion as a permeate and the lycopene-enriched portion as a retentate;
 c. concentrating the lycopene-depleted portion to at least 10° Brix;
 d. chromatographically fractionating the concentrated lycopene-depleted portion into two or more fractions, including a crude umami fraction with a weight ratio glutamate:monosaccharide of X and a monosaccharide fraction with a weight ratio glutamate:monosaccharide of Y, wherein the ratio X:Y exceeds 20; wherein the concentrated lycopene-depleted portion is chromatographically fractionated using ion exclusion chromatography; and wherein the crude umami fraction has a weight ratio citrate:monosaccharide of at least 1;
 e. optionally, concentrating the crude umami fraction;
 f. chromatographically fractionating the crude umami fraction into two or more fractions, including a clean umami fraction with a weight ratio glutamate:citrate of K and a citrate fraction with a weight ratio glutamate:citrate of L, wherein the ratio K:L exceeds 10; wherein the crude glutamate fraction is chromatographically fractionated using ion exclusion chromatography or ion exchange chromatography.

2. The method according to claim 1, wherein prior to step d), the lycopene-depleted portion is treated to reduce a total amount of calcium and magnesium ions in said portion, calculated on dry matter, by at least a factor of 4.

3. The method according to claim 1, wherein prior to step d), the lycopene-depleted portion is treated to reduce a total amount of calcium and magnesium ions in said portion to less than 50 mmol per kg of dry matter.

4. The method according to claim 1, wherein the lycopene-depleted portion contains, by weight of dry matter: 30-80% monosaccharides; 0.5-8% sucrose; 2-30% citrate; 1.5-20% glutamate; 0.4-6% aspartate; 0.5-15% pyroglutamate 0.1-3% 5'-adenosine monophosphate (5'-AMP); 0-30% of other tomato components.

5. The method according to claim 1, wherein the crude umami fraction contains, by weight of dry matter: 0-20% monosaccharides; 0.5-20% sucrose; 5-40% citrate; 3-40% glutamate; 1-10% aspartate; 1-20% pyroglutamate 0.1-5% 5'-AMP; 0-40% of other tomato components.

6. The method according to claim 1, wherein the monosaccharide fraction has a weight ratio citrate:monosaccharide of less than 0.01.

7. The method according to claim 1, wherein the clean umami fraction comprises by weight of dry matter: 6-75% glutamate; 0-10% 5'-AMP; 1-25% aspartate; 0-20% citrate; 0-10% monosaccharides; 0.1-15% sucrose; and wherein the weight ratio glutamate:citrate exceeds 2 and wherein glutamate, 5'-AMP, aspartate and pyroglutamate together represent at least 15% by weight of the dry matter contained in the tomato isolate.

* * * * *